US009039211B2

(12) United States Patent
Hoff et al.

(10) Patent No.: US 9,039,211 B2
(45) Date of Patent: May 26, 2015

(54) BROAD VIEW MIRROR FOR A CYCLE VEHICLE (71) Applicants: Vance A. Hoff, Grapeview, WA (US); Phillip G. Larson, Tahuya, WA (US); Perry D. Hoff, Grapeview, WA (US); Mark R. Hoff, Belfair, WA (US)

(72) Inventors: Vance A. Hoff, Grapeview, WA (US); Phillip G. Larson, Tahuya, WA (US); Perry D. Hoff, Grapeview, WA (US); Mark R. Hoff, Belfair, WA (US)

(73) Assignee: Old School Products LLC, Allyn, WA (US)

( * ) Notice: Subject to any disclaimer, the term of this patent is extended or adjusted under 35 U.S.C. 154(b) by 138 days.

(21) Appl. No.: 13/872,582

(22) Filed: Apr. 29, 2013

(65) Prior Publication Data

US 2013/0286493 A1 Oct. 31, 2013

Related U.S. Application Data (63) Continuation-in-part of application No. 29/453,401, filed on Apr. 29, 2013, now Pat. No. Des. 719,070, and a continuation-in-part of application No. 29/453,403, filed on Apr. 29, 2013, now Pat. No. Des. 719,490.

(60) Provisional application No. 61/639,511, filed on Apr. 27, 2012.

(51) Int. Cl.
*B60R 1/00* (2006.01)
*B62J 29/00* (2006.01)

(52) U.S. Cl.
CPC ... *B60R 1/00* (2013.01); *B62J 29/00* (2013.01)

(58) Field of Classification Search
CPC .......... B60R 1/00; B60R 1/007; B60R 1/064; B62J 29/00; G02B 7/182
See application file for complete search history.

(56) References Cited

U.S. PATENT DOCUMENTS

| 3,438,281 | A | 4/1969 | Chester |
| 5,745,310 | A | 4/1998 | Mathieu |
| 7,780,298 | B2 | 8/2010 | Greathouse |
| 7,837,339 | B2 | 11/2010 | Sakamoto |
| 2010/0188764 | A1* | 7/2010 | Wu ............................... 359/872 |

* cited by examiner

*Primary Examiner* — Joseph P Martinez
(74) *Attorney, Agent, or Firm* — Puget Patent; Michael Gibbons (57) ABSTRACT

A mirror assembly for mounting to a handlebar of a motorcycle or other cycle vehicle, including a handle enabling an operator of the motorcycle to rotate the mirror without requiring the operator to remove a hand from the handlebar. The rotation swivels the mirror from a view to the rear to a position with a view to the side. Upon releasing the handle, a compression spring within the assembly returns the mirror to its original position. The mounting arrangement for the assembly includes two portions rotatable perpendicularly to one another, permitting the mirror arrangement to be adjusted after coupling with the handlebar such that the stem of the mirror is plumb. This ensures that when the handle is engaged rotating the mirror, the orientation of the mirror is maintained such that the top edge of the mirror remains level during rotation and that the mirror stem remains plumb.

20 Claims, 8 Drawing Sheets

BROAD VIEW MIRROR FOR A CYCLE VEHICLE

PRIORITY CLAIM

This application claims priority from provisional application No. 61/639,511 filed Apr. 27, 2012; from the design patent application titled "MIRROR ROTATION CONTROL FOR A CYCLE VEHICLE", naming Vance A. Hoff, Phillip G. Larson. Perry D. Hoff and Mark R. Hoff as inventors filed Apr. 29, 2013 as application No. 29/453,401; and from the design patent application titled "MIRROR ROTATION MOUNT FOR A CYCLE VEHICLE", naming Vance A. Hoff, Phillip G. Larson. Perry D. Hoff and Mark R. Hoff as inventors filed Apr. 29, 2013 as application No. 29/453,403. The foregoing applications are hereby incorporated by reference in their entirety as if fully set forth herein.

FIELD OF THE INVENTION

This invention relates generally to cycle vehicles, and more specifically, to a broad view mirror for a cycle vehicle.

BACKGROUND

When operating a cycle vehicle, such as a motorcycle, moped, scooter, dirt bike, bicycle or other wheeled vehicle having a handlebar for steering, a view both in front and behind the operator is essential for safety. Motorcycles, for example, may be delivered from the factory with mirrors facilitating a view to the rear. These mirrors, one for the left side and one for the right side, may be mounted on mirror stems, with the mirror stems affixed to the handlebar to the left and right of the rider.

The coupling of the mirror stem with the handlebar may entail a channel through the handlebar, or through another control affixed to the handlebar (such as a brake or clutch lever assembly), into which the mirror stem is inserted. The bottom portion of the mirror stem may be threaded such that the mirror may be fixed in place, once the stem is passed through the channel, using an acorn nut or other similar fastener on the underside of the handlebar. The nut is tightened over the threaded portion of the mirror stem until the mirror stem is fixed in place relative to the handlebar.

The mirror itself is typically fixed to the mirror stem using a ball and socket arrangement, which facilitates hand-adjustment of the mirror by the operator of the vehicle to provide the best view behind the vehicle. The mirrors may be small, in order to not obstruct the forward view or add weight or bulk to the handlebar. Consequently, the view to the rear provided by the mirrors may not provide a complete picture. Particularly, while in one position the mirror may facilitate a view directly behind the vehicle, a blind spot to the side may exist. The operator may adjust the mirror to show the blind spot, but while riding this requires removing a hand from the handlebar. Further, adjusting the mirror while riding diverts attention from the operator's primary task of driving. Finally, once the mirror shows the blind spot, the view to the rear is taken away, requiring another hand adjustment to return the mirror to its approximate original view (and another diversion from driving).

U.S. Pat. No. 7,837,339, titled "Open Vehicle Rearview Mirror System for Switching Between Normal and Blind-Spot Views," issued to Sakamoto on Nov. 23, 2010, proposes a rear view system for a motorcycle in which the rider may actuate an electrically-driven motor and circuitry arrangement to rotate the mirrors to provide an additional view. Sakamoto, however, requires connection to the motorcycle's electrical system or requires an additional battery be installed, adding weight to the vehicle. The electric motor and circuitry arrangement adds undue complexity and expense to the cost of the vehicle, and the system is best provided from the factory with mirrors and adjusting relays integrated in housings matched with the fairing of the vehicle. While Sakamoto is ambiguous regarding after-market application of the invention, it is unlikely that such an installation would be practical given the required fairing modifications, connections to the electrical system and/or heavy relays behind the mirror that would not be supported by a simple mirror stem.

What is needed, then, is a mirror design for a cycle vehicle, such as a motorcycle, bicycle and the like, whereby once the mirror is adjusted for a rear view, an operator may view the blind spot temporarily while riding without unduly jeopardizing operator safety. Further, when the operator is done looking to the blind spot, the mirror should return by itself to its original position showing the view to the rear. The design should be able to be installed on a motorcycle once delivered from the factory as an after-market option, and require no complex circuitry, no integration with the vehicle's electrical system, no undue change in weight or balance of the vehicle, and be constructed inexpensively. Such a design would permit the broadest cross-section of riders to benefit from a low-cost, after-market solution that enhances motorcycle safety.

Accordingly, what is disclosed is a broad view mirror for a cycle vehicle.

SUMMARY

Embodiments involving a broad view mirror for a cycle vehicle may take different forms. An exemplary system for a broad view mirror for a cycle vehicle may include a main frame; a bearing cap; a spring carrier arrangement, the spring carrier arrangement disposed between the main frame and bearing cap, the spring carrier arrangement including at least a compression spring for engaging and tensionally biasing the spring carrier relative to the main frame; a frame mounting bracket; a handlebar mounting bracket; a mirror including at least a mirror stem, the mirror stem including at least a portion of the mirror stem disposed through the main frame, bearing cap and spring carrier arrangement; and a handle, the handle fixedly coupled with the mirror stem.

Additional possible system features may include the mirror stem threaded through the main frame, the spring carrier arrangement, the bearing cap and the handle. Additional possible system features may include the spring carrier arrangement including at least a spring carrier; a compression spring at least partially disposed within the spring carrier; a spring bushing, the spring bushing including at least: a shaft of the spring bushing, the shaft of the spring bushing disposed within the compression spring, wherein a face of the spring bushing opposite the compression spring engages a portion of the main frame. Additional possible system features may include the spring carrier arrangement including at least an upper bearing, the upper bearing received by the main frame; a lower bearing, the lower bearing received by the bearing cap; and a lower bushing, the lower bushing received by the bearing cap and disposed between the bearing cap and the handle.

Additional possible system features may include at least a mirror stem threading arrangement including at least the mirror stem threaded through an upper spacer, the main frame, the upper bearing, the spring carrier, the lower bearing, the lower bushing, the bearing cap and the handle, a portion of the mirror stem further threaded into a mirror stem lock nut. Additional possible system features may include at least a gap between the main frame and bearing cap defining a receptacle for the spring carrier, wherein a height of the spring carrier is shorter than the height of the gap, and wherein at least two threaded fasteners couple the main frame and bearing cap. Additional possible system features may include at least the spring carrier rotatable about an axis of the mirror stem in between the main frame and bearing cap. Additional possible system features may include at least a limit of rotation defined by a portion of the spring carrier engaging a portion of the main frame. Additional possible system features may include at least the compression spring biasing the portion of the spring carrier to engage the portion of the main frame, the engaged position defining a home position for the mirror stem.

Additional possible system features may include the mirror stem threading arrangement permitting an engagement of the handle to rotate the mirror stem against the tensional bias of the compression spring to a second position for the mirror stem, the second position defined by a second portion of the spring carrier engaging a second portion of the main frame, and wherein the handle being released permits the tensional bias of the compression spring to return the mirror stem to the home position for the mirror stem. Additional possible system features may include a receptacle of the bearing cap for receiving the lower bushing and lower bearing has a first height, and wherein the lower bushing has at least two diameters including at least a first diameter of the lower bushing which fits within the lower bearing, and wherein at least a portion of a second diameter of the lower bushing protrudes through the receptacle and below the bearing cap.

Additional possible system features may include the frame mounting bracket rotatably coupled with the main frame. Additional possible system features may include the handlebar mounting bracket rotatably coupled with the frame mounting bracket, the handlebar mounting bracket including at least a channel for receiving a threaded fastener for coupling the handlebar mounting bracket with a handlebar of a cycle vehicle. Additional possible system features may include a frame mount axis about which the frame mounting bracket rotates is orthogonal to a handlebar mount axis about which the handlebar mounting bracket rotates. Additional possible system features may include a frame threaded fastener facilitating the rotation of the frame mounting bracket relative to the main frame, and wherein a mounting threaded fastener facilitates the rotation of the handlebar mounting bracket relative to the frame mounting bracket.

Additional possible system features may include the rotation of the frame mounting bracket and rotation of the handlebar mounting bracket configurable to maintain the mirror stem in a plumb position. Additional possible system features may include the rotation of the frame mounting bracket and rotation of the handlebar mounting bracket ensure the plumb position is maintained during engagement of the handle and rotation of the mirror stem. Additional possible system features may include the broad view mirror coupled to a handlebar of the cycle vehicle via a bolt through a channel in the handlebar configured for receiving an original-equipment mirror stem.

Another exemplary system for a broad view mirror for a cycle vehicle may include a frame arrangement configured for receiving a mirror stem of a mirror; a spring carrier arrangement enabling the mirror to rotate responsive to an engagement of a handle coupled with the mirror stem and spring carrier arrangement, the spring carrier arrangement enabling the mirror to return to a home position when the handle is disengaged; and a mounting bracket arrangement enabling the mirror stem to maintain a plumb orientation when the handle is engaged.

An exemplary method for using a broad view mirror for a cycle vehicle may include at least providing a broad view mirror for a cycle vehicle, the broad view mirror including at least a frame mounting bracket and a handlebar mounting bracket; passing a threaded portion of a mirror stem through a main frame, a spring carrier arrangement, a bearing cap and a handle of the broad view mirror; rotatably threading at least two fasteners through the bearing cap and into the main frame, fixedly coupling the bearing cap and main frame; rotatably threading a fastener onto the threaded portion of the mirror stem, fixedly coupling the mirror stem, handle and spring carrier arrangement; affixing the handlebar mounting bracket to a handlebar of the cycle vehicle; orienting the frame mounting bracket and handlebar mounting bracket relative to one another and to the handlebar of the cycle vehicle to orient the mirror stem in a plumb position; receiving an engagement of the handle, the engagement of the handle rotating the mirror stem within the main frame and bearing cap from a first position to the second position, the orientation of the mounting brackets maintaining the mirror stem in a plumb position during rotation, the rotation of the mirror stem providing an operator of the cycle vehicle with a different mirror view via a mirror fixedly coupled to the mirror stem; and returning the mirror stem to the first position from the second position upon the handle being disengaged, the returning the mirror via a compression spring of the spring carrier arrangement tensionally biased against a portion of the main frame, the returning the mirror stem providing the operator of the cycle vehicle with an original mirror view via the mirror fixedly coupled to the mirror stem.

In addition to the foregoing, various other system and method embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

This invention relates generally to cycle vehicles, and more specifically, to a broad view mirror for a cycle vehicle. Specific details of certain embodiments of the invention are set forth in the following description and in FIGS. 1-11 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
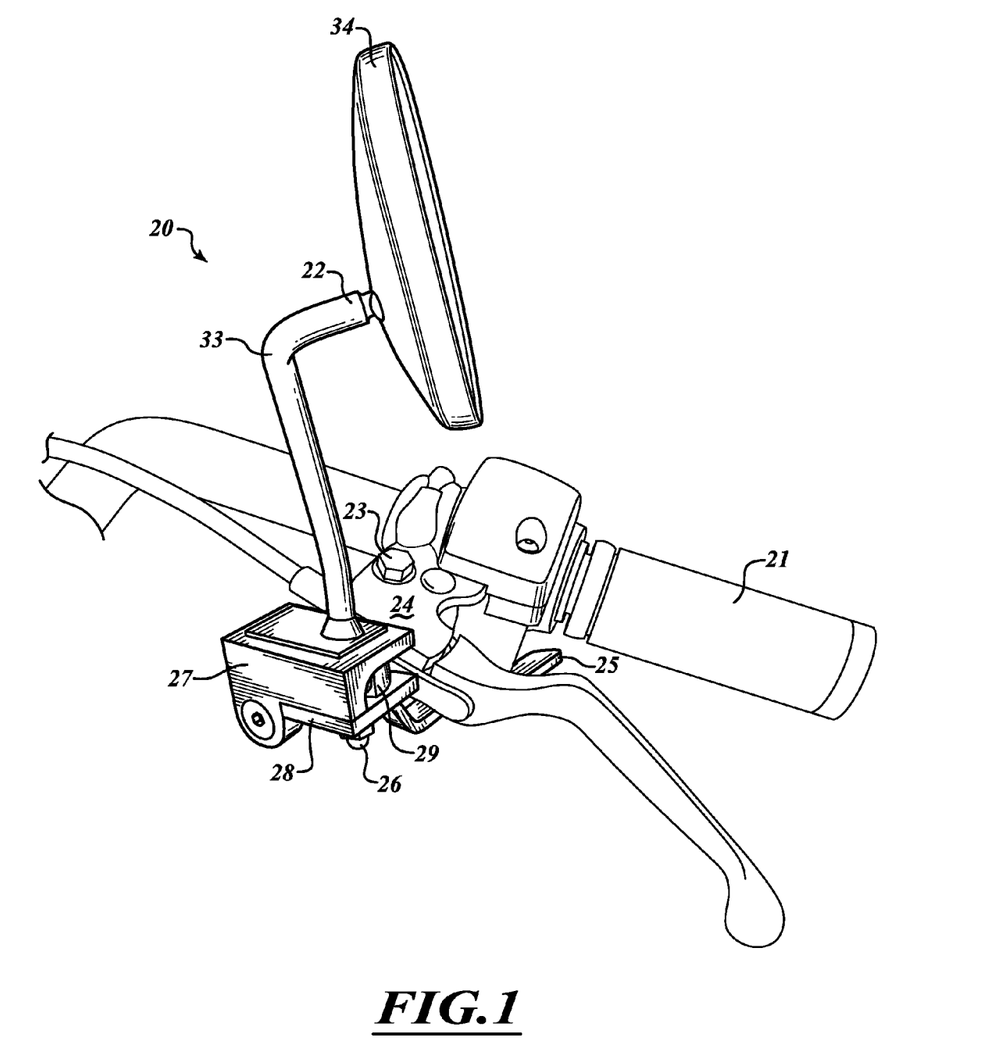
FIG. 1 is an isometric view of a broad view mirror for a cycle vehicle installed on a handlebar, in accordance with an embodiment of the invention.
Figure 2:
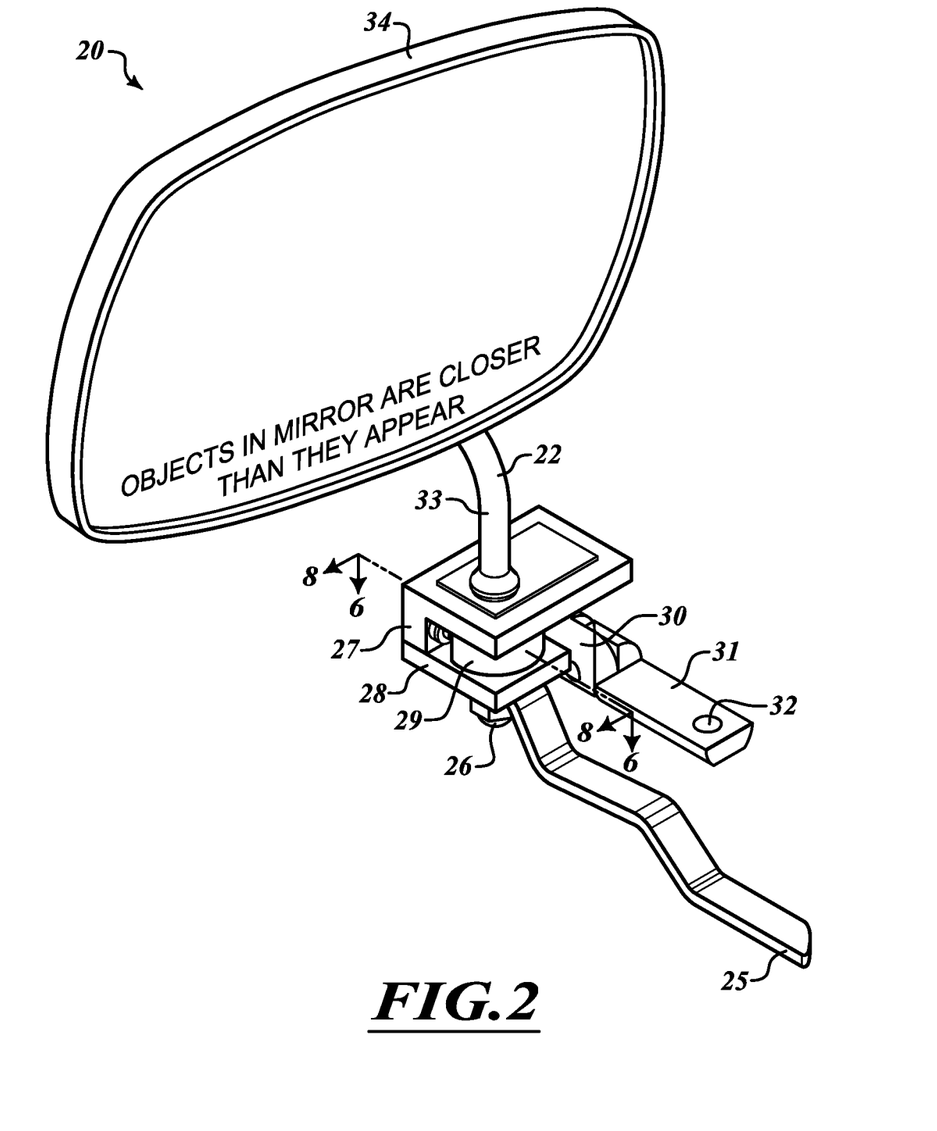
FIG. 2 is an isometric view of a broad view mirror for a cycle vehicle, in accordance with an embodiment of the invention.
Figure 3:
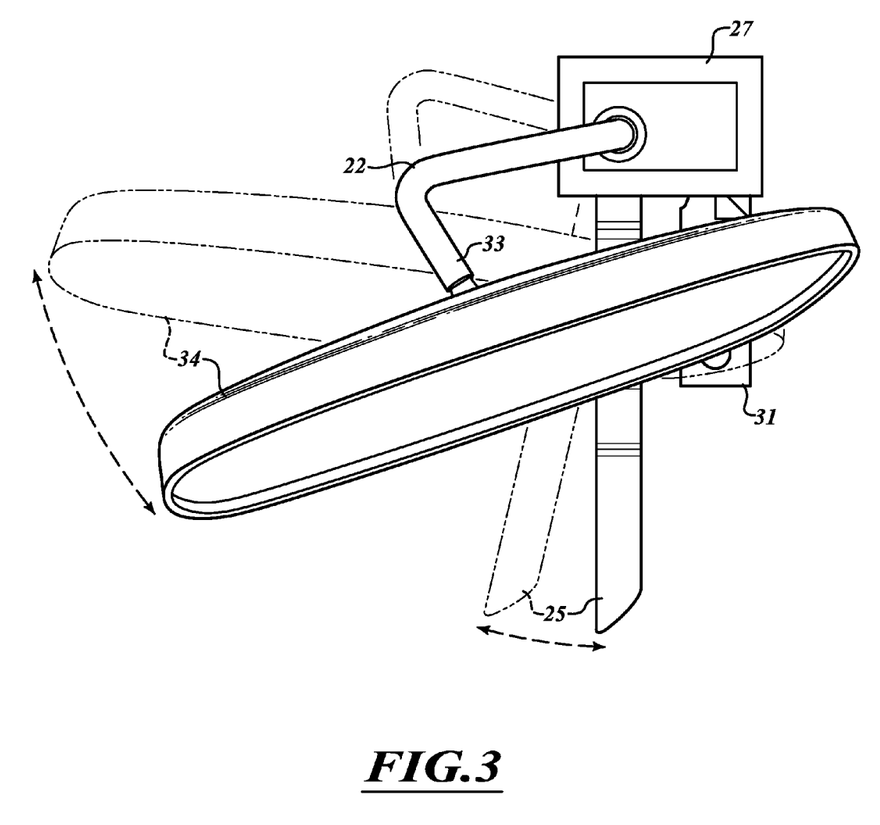
FIG. 3 is a top plan view of a broad view mirror for a cycle vehicle, in accordance with an embodiment of the invention.

FIG. 1 is an isometric view of a broad view mirror for a cycle vehicle installed on a handlebar, in accordance with an embodiment of the invention. FIGS. 2 and 3 are an isometric view and a top plan view of a broad view mirror for a cycle vehicle, in accordance with an embodiment of the invention. A cycle vehicle may be any vehicle in which steering is controlled with a handlebar, including a motorcycle, moped, scooter, dirt bike, bicycle or other wheeled vehicle having a handlebar for steering. For brevity, the remainder of the instant disclosure will use the term motorcycle to mean a cycle vehicle.

In some embodiments, the broad view mirror 20 for a cycle vehicle includes a main frame 27, a bearing cap 28, a spring carrier arrangement 29, a frame mounting bracket 30, a handlebar mounting bracket 31, a mirror arrangement 22 including a mirror 34 and mirror stem 33, and a handle 25.

In some embodiments, a broad view mirror (BVM) 20 may include an arrangement 22 of a mirror and mirror stem. In different embodiments, the invention may include the BVM parts (main frame, bearing cap, etc.) other than the arrangement of the mirror and mirror stem, whereby the mirror and mirror stem included with the motorcycle from the factory is attached to the invention during installation of the BVM. As depicted in the top plan view of FIG. 3, the arrangement of the mirror and mirror stem of the broad view mirror is rotatable by an operator of the motorcycle using the handle 25 of the broad view mirror. The rotation of the mirror and mirror stem may facilitate, for example, the operator of the motorcycle viewing a larger portion of the scene to the side of the motorcycle, including a blind spot. Further, as seen in FIG. 1, the handle 25 is positioned such that the operator may operate the handle to rotate the BVM from a first position (a home position) to a second position without removing a hand from the handlebar 21, for safer operation of the motorcycle. Once the rider releases the handle 25, the mirror and mirror stem return to their original position via the spring carrier arrangement 29, the spring carrier arrangement being disposed between the main frame and bearing cap and including a compression spring tensionally biasing the spring carrier arrangement against the main frame and returning the BVM to the first position.

In some embodiments, a broad view mirror 20 may be installed on a control of the motorcycle mounted to the handlebar 21. For example, the motorcycle may be delivered from the factory with a mirror arrangement coupled with the clutch lever assembly 24, the lever positioned on the left side of the handlebar. The mirror stem of the factory mirror arrangement may have a threaded portion opposite the mirror side of the stem, with the threaded portion being inserted in a channel through the mounting bracket of the clutch lever assembly. Once the stem is passed through the channel at the factory, an acorn nut or other similar fastener is tightened over the threaded portion of the mirror stem until the mirror stem is fixed in place relative to the handlebar and clutch lever assembly. The factory motorcycle may include a second mirror arrangement on the right side of the motorcycle handlebar, in which the mirror stem may be disposed through a channel in the front brake lever assembly coupled with the right side of the handlebar.

Installing the broad view mirror 20 on a factory motorcycle entails removing the factory mirror arrangement 22 (the mirror and mirror stem) from the clutch and/or front brake lever assembly. In some embodiments, the mirror arrangement may then be coupled with the remainder of the broad view mirror 20 as described elsewhere herein. In different embodiments, the broad view mirror is provided with its own mirror arrangement, and the original, factory mirror arrangement is not utilized. A bolt 23 or other threaded fastener may be inserted through the channel in the lever assembly from whence the mirror arrangement came, the bolt being long enough to extend past the underside of the assembly. A mounting arrangement of the broad view mirror is threaded over the bolt and held against the underside of the lever assembly. Particularly, the handlebar mounting bracket 31 includes a handlebar mount channel 32 disposed through the bracket. The bolt passes through the handlebar mount channel, with a nut securing the mounting arrangement to the underside of the lever assembly.

The position of the main frame 27 may then be oriented relative to the handlebar to which the BVM is mounted via adjustments to the handlebar mounting bracket 31 and frame mounting bracket 30. As will be discussed further, the handlebar mounting bracket is rotatably coupled to the frame mounting bracket and the frame mounting bracket is rotatably coupled to the main frame. The two rotatable couplings of the mounting brackets are orthogonal to one another, ensuring that the BVM may be adjusted and/or oriented following coupling with the handlebar so that the mirror stem is in a plumb orientation. Beneficially, if the mirror stem is plumb during installation, it will remain so when the handle 25 is engaged rotating the mirror. Correct orientation of the BVM ensures that when the handle is engaged, the resulting rotation of the mirror stem will not rotate the mirror out of the field of view of the operator of the motorcycle.

While FIG. 1 depicts the broad view mirror installed on the clutch lever assembly 24 on the left side of the motorcycle, and FIGS. 2 and 3 depict a left side version of the BVM, the operation of installing a broad view mirror on the right side of the motorcycle via the front brake lever assembly is essentially the same. Portions of the broad view mirror are provided in reverse configurations to reflect their installation on the left or right side of the motorcycle, as will be described elsewhere herein. (In other words, there is a left side version of the broad view mirror and a right side version of the broad view mirror, and while only one side may be depicted and/or described herein, the teachings of the instant disclosure are intended to apply equally to BVM versions for either side of the cycle vehicle.)

Figure 4:
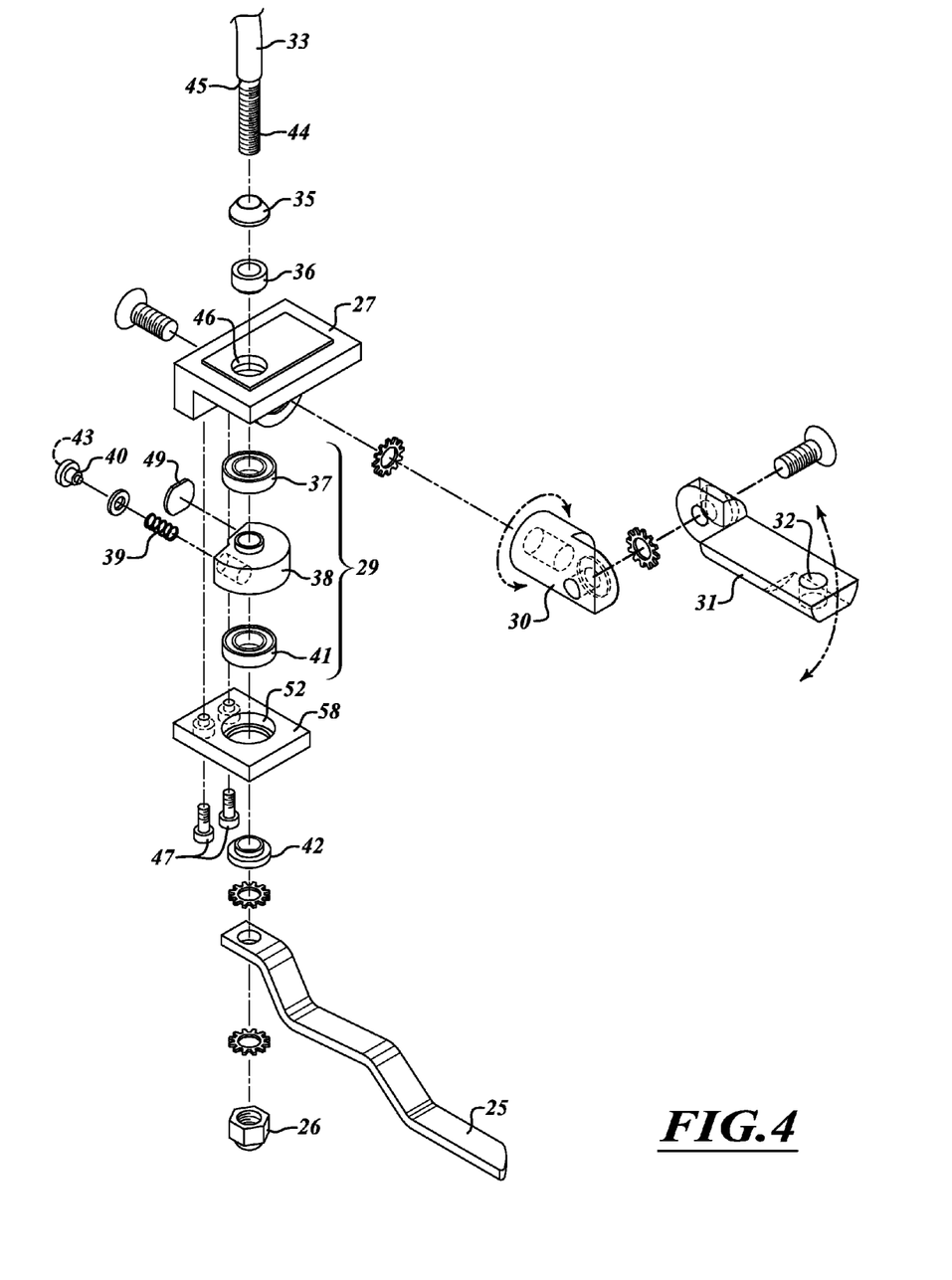
FIG. 4 is an exploded isometric view of a broad view mirror for a cycle vehicle, in accordance with an embodiment of the invention.
Figure 5:
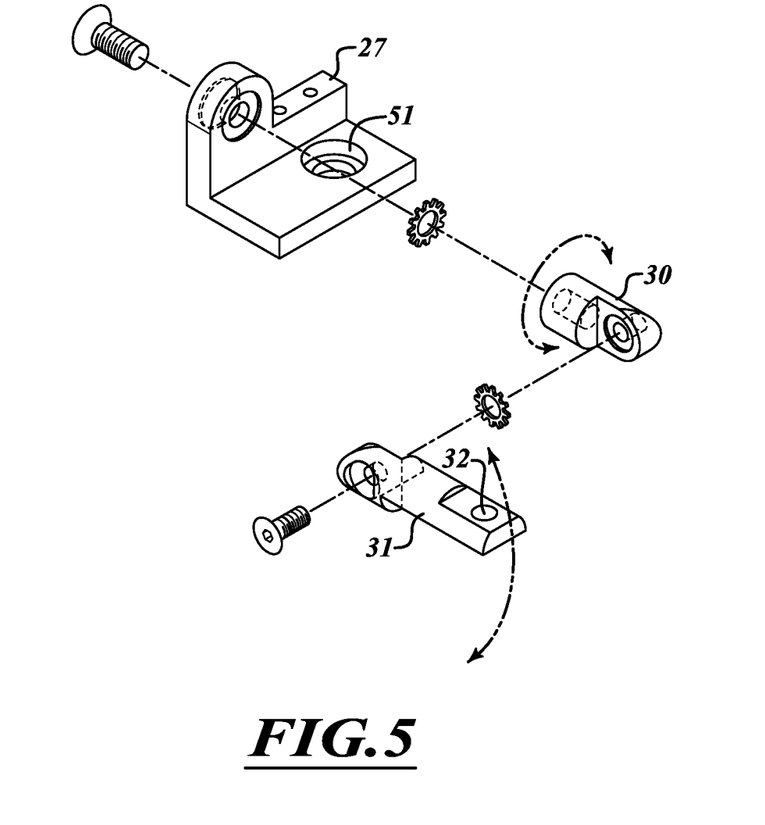
FIG. 5 is an exploded isometric view of a mounting arrangement of a broad view mirror for a cycle vehicle, in accordance with an embodiment of the invention.
Figure 8:
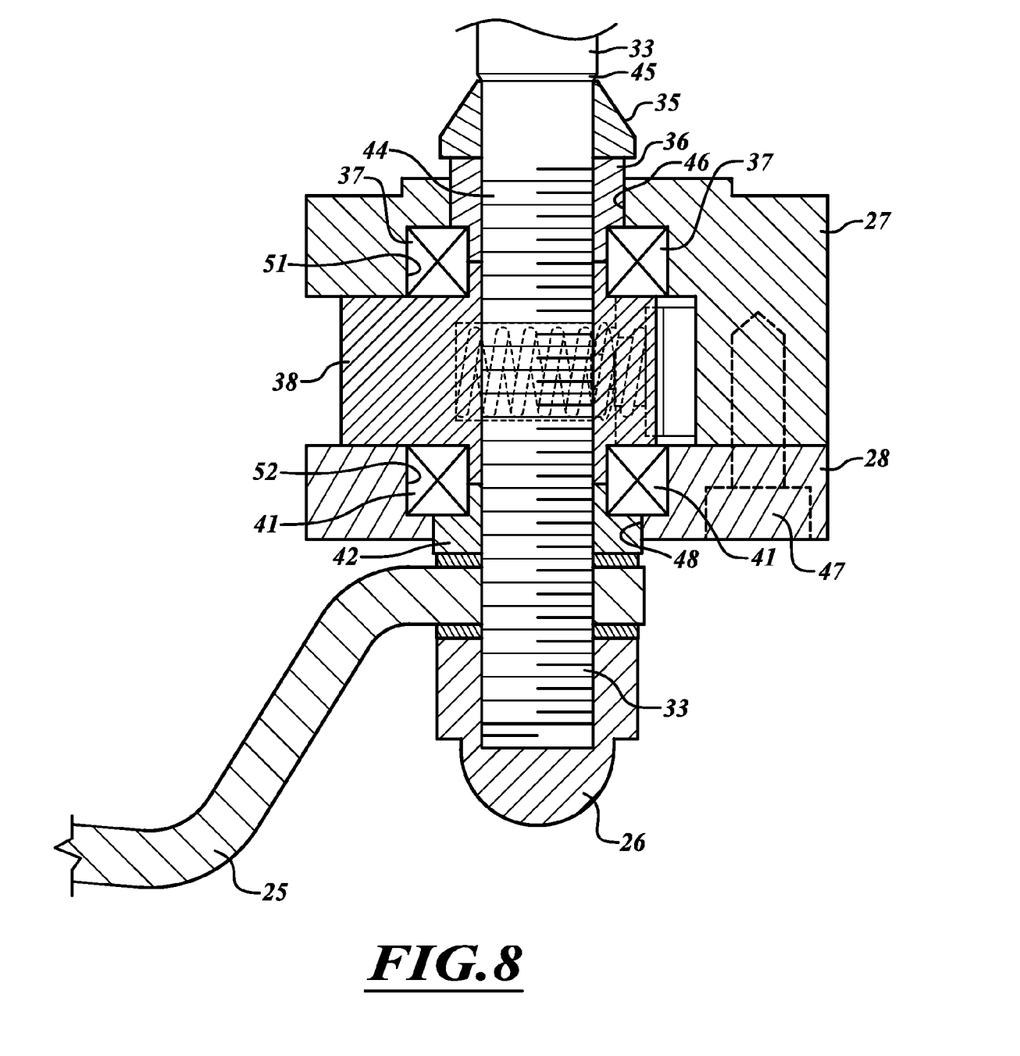
FIG. 8 is a side cross-sectional view of a different section of a broad view mirror for a cycle vehicle, in accordance with an embodiment of the invention.

FIG. 4 is an exploded isometric view of a broad view mirror for a cycle vehicle, in accordance with an embodiment of the invention. FIG. 5 is an exploded isometric view of the mounting arrangement of a broad view mirror for a cycle vehicle, in accordance with an embodiment of the invention. FIG. 8 is a side cross-sectional view of a section of a broad view mirror for a cycle vehicle, in accordance with an embodiment of the invention. In some embodiments, the broad view mirror 20 is configured to permit the mirror stem 33 to rotate relative to the main frame 27 and bearing cap 28. The rotation is facilitated by an arrangement of the mirror stem threading through the main frame, bearing cap and a series of bearings, spring carrier, star washers, spacers, a bushing and a fastener, but leaving room between the mirror stem and the channels through the main frame and bearing cap.

Particularly, an upper spacer 35 and an upper collar 36 are slipped over the mirror stem 33 and passed beyond the threaded portion 44 of the mirror stem. A lip 45 of the mirror stem limits the travel of the upper spacer along the mirror stem. The upper collar is configured to loosely fit within a collar cavity 46 in the top face of the main frame 27. The upper collar may have two diameters and the collar cavity may have a two-level design also featuring two diameters. The smaller diameter of the upper collar fits inside the smaller diameter of the collar cavity, with the larger diameter of the upper collar resting on a shelf of the collar cavity formed by the change in diameters. The foregoing arrangement of the upper spacer against the lip of the mirror stem, the upper collar underneath the upper spacer, and the upper collar resting within the collar cavity of the main frame serves to limit the travel of the mirror stem within the main frame and remainder of the BVM.

Once the mirror stem 33 is passed through the upper spacer 35, upper collar 36 and main frame 27, it next passes through the spring carrier arrangement 29, the spring carrier arrangement being disposed between the main frame 27 and bearing cap 28. The spring carrier arrangement has components which are stacked, with the stack being sandwiched between the main frame and bearing cap before a plurality of bearing cap fasteners 47 are inserted in channels in the bearing cap and main frame and tightened. Particularly, the spring carrier arrangement includes a plurality of sealed bearings, including an upper bearing 37 and lower bearing 41. The sealed bearings are configured to fit loosely within bearing cavities 51 and 52 of the main frame and bearing cap respectively (bearing cavity of the main frame also visible in FIG. 5), permitting the spring carrier arrangement to at least partially rotate relative to the main frame and bearing cap. The interior diameter of the sealed bearings is sized to fit over collars disposed on the top and bottom face of the spring carrier. The sealed bearings at least partially facilitate rotation of the mirror stem arrangement within the main frame and bearing cap, while reducing vibration which might otherwise be transmitted to the mirror and permitting a smooth rotation.

The spring carrier arrangement 29 also includes a compression spring 39 and a spring bushing 40 (the spring bushing 40 having a face 43 disposed on the end of the bushing opposite the compression spring) which will be described in further detail elsewhere.

Once the spring carrier arrangement 29 is sandwiched between the main frame 27 and bearing cap 28, with the mirror stem 33 inserted through the channel in the main frame and through the apertures in the spring carrier arrangement, a lower bushing 42 is slipped over the mirror stem and inserted into a lower bushing cavity 48 of the bearing cap. The lower bushing cavity is shaped similarly to the collar cavity 46 of the main frame and the lower bushing is shaped similarly to the upper collar. Therefore, the lower bushing may fit loosely within the lower bushing cavity, permitting the bushing to rotate within the cavity. The two diameters of the lower bushing cavity and lower bushing provide a limit of travel of the bushing within the cavity. Further, at least a portion of the lower bushing protrudes from the bottom of the bearing cap.

Finally, the handle 25 is slipped over the mirror stem 33. An acorn nut 26 (i.e. a mirror stem lock nut) is threaded over the threaded portion 44 of the mirror stem 33 and tightened. A star washer may be disposed between the lower bushing 42 and handle, and another star washer may be disposed between the handle and acorn nut, the star washers providing a better locking of the acorn nut, handle and lower bushing.

The foregoing mirror stem arrangement fixedly couples the handle with the mirror stem and spring carrier. The spacing of the diameters of the channels in the main frame and bearing cap versus the upper collar, bearings and lower bushing permit a loose engagement of these components, as does the protrusion of the lower bushing below the lower face of the bearing cap. Thus, swiveling of the mirror stem is facilitated by not locking the mirror stem with the main frame and bearing cap, but rather, having the components fixed with the mirror stem (e.g. the lower bushing) sit loosely in a lateral direction within the cavities receiving those components in the main frame and bearing cap. The upper and lower bearings disposed within the mirror stem arrangement provide a smooth rotation while reducing vibration of the mirror within the arrangement induced by riding. Therefore the handle, when engaged, rotates the mirror stem and the spring carrier.

Figures 6, 7:
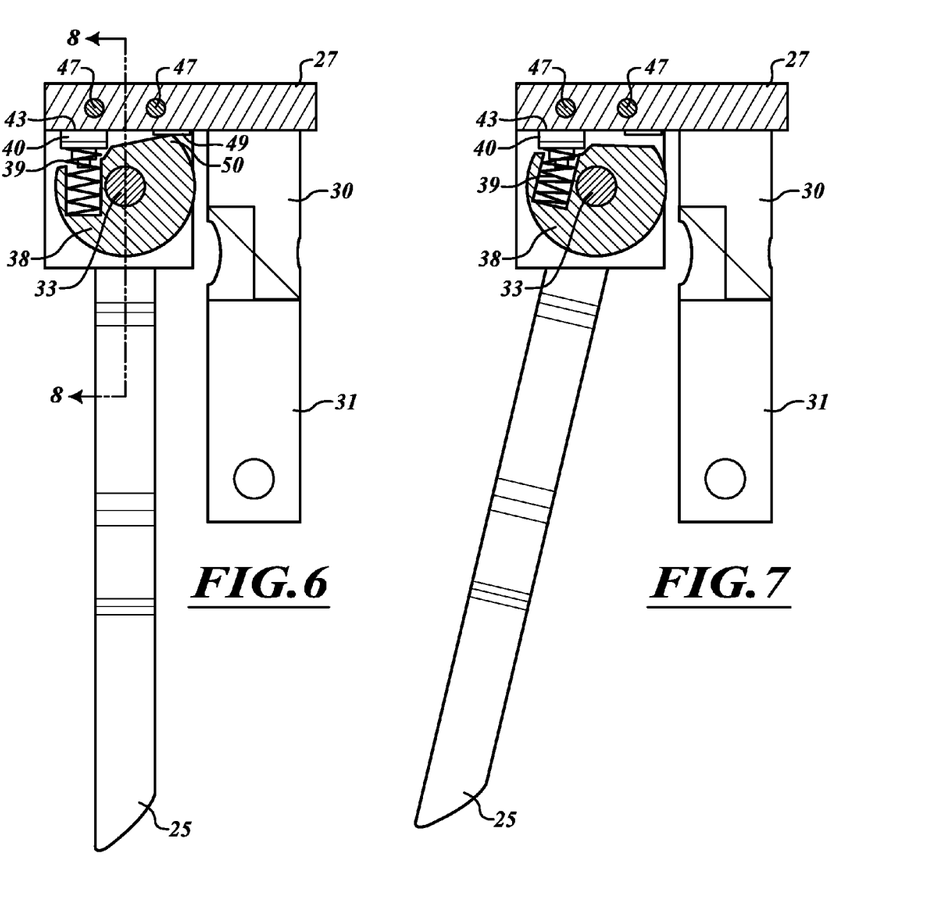
FIGS. 6 and 7 are top cross-sectional views of a section of a broad view mirror for a cycle vehicle, in accordance with an embodiment of the invention.

FIGS. 6 and 7 are top cross-sectional views of a section of a broad view mirror for a cycle vehicle, in accordance with an embodiment of the invention. In some embodiments, the broad view mirror 20 includes a spring carrier 38. The mirror stem 33 is disposed through the spring carrier as described elsewhere herein, such that rotation of the mirror stem via the handle 25 being engaged or disengaged also rotates the spring carrier. The spring carrier carries at least a portion of a compression spring 39 (a channel cut into the spring carrier is configured for receiving the at least a portion of the compression spring). A spring bushing 40 is provided, the spring bushing including a shaft which is inserted into the compression spring. The spring bushing also has a face 43 disposed on the end of the spring bushing opposite the compression spring. In some embodiments, a washer may be slipped over the shaft of the spring bushing, the washer disposed between the compression spring and the face of the spring bushing.

When the spring carrier 38 is sandwiched between the main frame 27 and bearing cap 28 (as may be seen and was described with reference to FIGS. 4 and 8), the compression spring 39 and spring bushing 40 are disposed such that the face 43 of the spring bushing engages a portion of the main frame. The opposite end of the spring tensionally biases the spring carrier itself, rotating it within the main frame and bearing cap. This rotation is limited by an angular portion 50 of the spring carrier contacting the main frame. In some embodiments, a pad 49 may be inserted in the device between the angular portion of the spring carrier and the main frame. The spring carrier and main frame are constructed of metal, so the pad reduces the impact of the angular portion against the main frame.

When the handle 25 is engaged, the compression spring 39 is compressed as the spring carrier 38 rotates, as is shown in FIG. 7. Upon the handle being released, the compression spring expands since it is no longer under the pressure of the handle being engaged. The expansion of the compression spring rotates the spring carrier to its original position. As the spring carrier is fixed relative to the mirror stem 33 as described elsewhere herein, engagement of the handle rotates the mirror stem as well as the spring carrier, while releasing the handle rotatably returns the spring carrier and mirror stem to their original position, with the angular portion 50 of the spring carrier resting against the pad 49 and a portion of the main frame 27.

Figure 9:
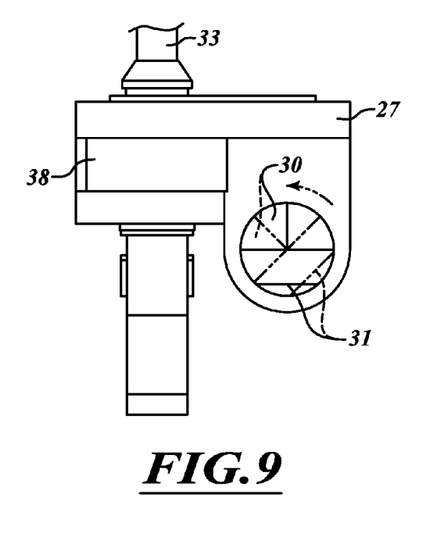
FIGS. 9 and 10 are rear plan views of a broad view mirror for a cycle vehicle, in accordance with an embodiment of the invention.
Figure 10:
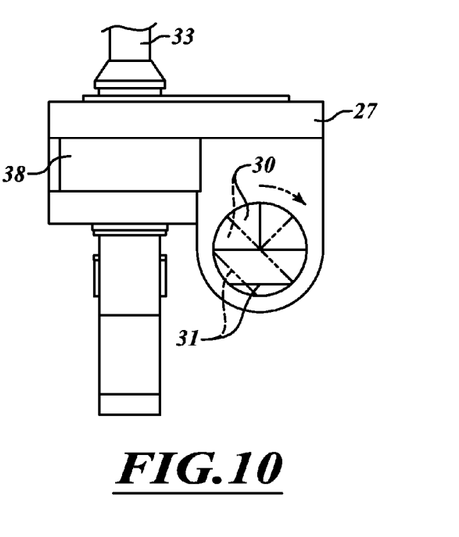
Figure 11:
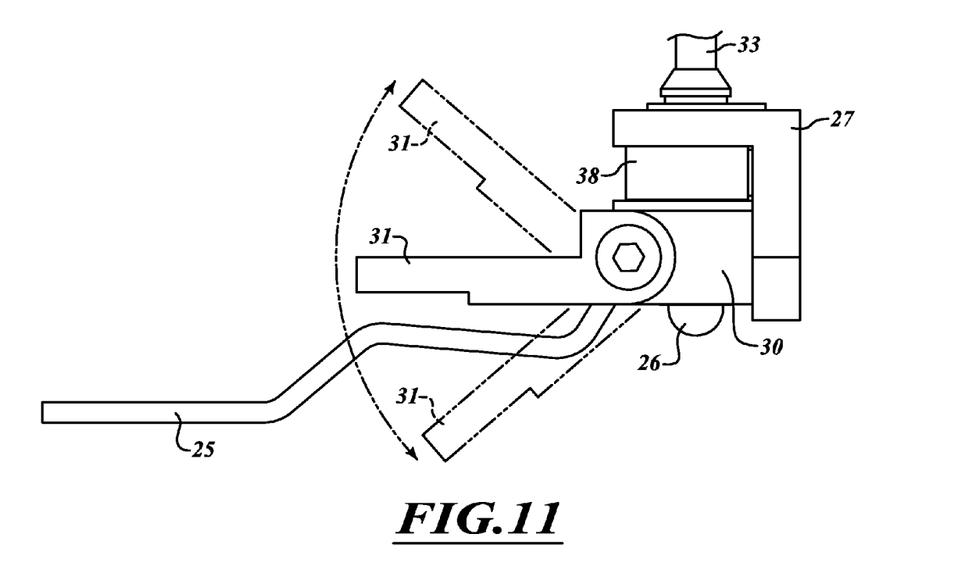
FIG. 11 is a side plan view of a broad view mirror for a cycle vehicle, in accordance with an embodiment of the invention.

FIG. 5 is an exploded isometric view of a mounting arrangement of a broad view mirror for a cycle vehicle, in accordance with an embodiment of the invention. FIGS. 9 and 10 are rear plan views of a broad view mirror for a cycle vehicle, in accordance with an embodiment of the invention. FIG. 11 is a side plan view of a broad view mirror for a cycle vehicle, in accordance with an embodiment of the invention. In some embodiments, a broad view mirror includes at least a frame mounting bracket 30 (Mounting Bracket Part A) and a handlebar mounting bracket 31 (Mounting Bracket Part B).

The frame mounting bracket 30 is rotatably coupled with the main frame 27 using a threaded fastener. As may be seen in FIGS. 9 and 10, the frame mounting bracket may be rotated to the desired orientation prior to tightening the threaded fastener. (The handlebar mounting bracket is shown in FIGS. 9 and 10 as inline coaxially with the frame mounting bracket.) A star washer may be provided for maintaining a better locking of the frame mounting bracket to the main frame. Additionally, as may be seen in FIG. 11, the handlebar mounting bracket 31 rotatably couples with the frame mounting bracket 30 using an additional threaded fastener. The handlebar mounting bracket may be at least partially rotated relative to the frame mounting bracket to a desired orientation prior to tightening the additional threaded fastener. An additional star washer may be provided for maintaining a better locking of the frame mounting bracket and handlebar mounting bracket. (FIG. 5 shows the fastener and star washer arrangement with the mounting brackets.)

The rotations of the frame mounting bracket 30 and handlebar mounting bracket 31 may be performed after the handlebar mounting bracket is mounted to the handlebar 21 (via the lever assembly 24 as described elsewhere herein). By loosening the threaded fasteners coupling the mounting brackets and main frame 27 and rotating the mounting brackets, the position of the main frame may be adjusted to a substantially level position relative to the ground, providing a substantially plumb orientation of the mirror stem 33. The mounting brackets are orthogonal to one another, ensuring that any positioning of the brackets and main frame required to achieve the leveling of the main frame is possible. Leveling the main frame and achieving a plumb orientation of the mirror stem ensures that when the handle 25 is operated, the mirror 34 retains a substantially level position, rotating only in the mirror stem axis and not drooping or turning diagonally.

In some embodiments, a method of using a broad view mirror for a cycle vehicle is provided. The method may include an operation of providing a broad view mirror for a cycle vehicle, the broad view mirror including at least a frame mounting bracket and a handlebar mounting bracket. The broad view mirror for a cycle vehicle may be as substantially described elsewhere herein, whereby the BVM may be provided with a mirror and mirror stem arrangement, or without the mirror and mirror stem arrangement. If the BVM is provided without the mirror and mirror stem arrangement, an alternate mirror and mirror stem arrangement is removed from an existing motorcycle having a factory-installed mirror arrangement, the alternate arrangement then being coupled with the BVM.

The method may also include an operation of passing a threaded portion of a mirror stem through a main frame, a spring carrier arrangement, a bearing cap and a handle of the broad view mirror. The spring carrier arrangement is disposed within a gap between the main frame and bearing cap, the gap suitably sized for receiving the spring carrier arrangement while still permitting the spring carrier arrangement to rotate within the main frame and bearing cap.

The method may also include an operation of rotatably threading at least two fasteners through the bearing cap and into the main frame, fixedly coupling the bearing cap and main frame. Fixedly coupling the bearing cap and main frame sandwiches the spring carrier arrangement in between the bearing cap and main frame. The spring carrier arrangement includes bearings disposed around collars in the spring carrier, the bearings being received by bearing cavities in the underside of the main frame and the top surface of the bearing cap.

The method may also include an operation of rotatably threading a fastener onto the threaded portion of the mirror stem, fixedly coupling the mirror stem, handle and spring carrier arrangement. A lower bushing may be threaded onto the mirror stem after pushing the mirror stem through the main frame, spring carrier arrangement and bearing cap, but prior to slipping the handle over the mirror stem and threading the fastener (which may be an acorn nut) onto a threaded portion of the mirror stem and tightening the fastener. Tightening the fastener locks the lower bushing, spring carrier arrangement, handle and mirror stem together, such that engaging the handle rotates the mirror stem.

The method may also include an operation of affixing the handlebar mounting bracket to a handlebar of the cycle vehicle. The handlebar mounting bracket may have a channel disposed through a flat portion of the handlebar mounting bracket, the channel designed so that the handlebar mounting bracket can be slipped over a bolt disposed through a channel in a lever mounting bracket assembly of a handlebar of the motorcycle. The flat portion of the handlebar mounting bracket is configured to rest underneath the lever mounting bracket assembly of the handlebar, with a fastener tightening the mounting bracket and BVM against the assembly.

The method may also include an operation of orienting the frame mounting bracket and handlebar mounting bracket relative to one another and to the handlebar of the cycle vehicle to orient the mirror stem in a plumb position. The threaded fasteners coupling the frame mounting bracket to the main frame and the handlebar mounting bracket to the frame mounting bracket may be loosened. Loosening these two fasteners facilitates rotation of the mounting brackets relative to one another and the main frame. The directions of rotation are substantially orthogonal to one another, ensuring that any rotational adjustment which places the top surface of the main frame in a substantially level orientation relative to the ground is possible. Leveling the top surface of the main frame also orients the mirror stem in a substantially plumb orientation (i.e. the extended axis of the mirror stem is perpendicular to the ground).

The method may also include an operation of receiving an engagement of the handle, the engagement of the handle rotating the mirror stem within the main frame and bearing cap from a first position to the second position, the orientation of the mounting brackets maintaining the mirror stem in a plumb position during rotation, the rotation of the mirror stem providing an operator of the cycle vehicle with a different mirror view via a mirror fixedly coupled to the mirror stem. An operator of the motorcycle may press the lever by hand without removing the hand from the handlebar of the motorcycle. As described above, the lever is fixedly coupled with the mirror stem, the mirror stem lockibly engaged with the spring carrier. The mirror stem and spring carrier are disposed within the main frame and bearing cap such that the arrangement of the handle, mirror stem and spring carrier rotate in tandem relative to the main frame and bearing cap. The operation of leveling the main frame ensures the mirror stem remains plumb during rotation, and the rotation swivels the mirror such that a view to the side of the motorcycle is provided, enabling a rider to see a blind spot without having to turn and look over the shoulder. The plumb mirror stem ensures that rotation does not result in the mirror drooping or being rotated into a crooked orientation, which would reduce the effectiveness of the new view. The operation of receiving the engagement of the handle pushes against the tension provided by a compression spring and spring bushing disposed between the spring carrier and the main frame.

The method may also include an operation of returning the mirror stem to the first position from the second position upon the handle being disengaged, the returning the mirror via a compression spring of the spring carrier arrangement tensionally biased against a portion of the main frame, the returning the mirror stem providing the operator of the cycle vehicle with an original mirror view via the mirror fixedly coupled to the mirror stem. Upon the rider releasing the handle, the compression spring expands, rotating the spring carrier and mirror stem back to their original position. Thus, the mirror is automatically returned to its home position upon releasing the handle.

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A broad view mirror for a cycle vehicle, comprising:
    a main frame;
    a bearing cap;
    a spring carrier arrangement, the spring carrier arrangement disposed between the main frame and bearing cap, the spring carrier arrangement including at least a compression spring for engaging and tensionally biasing the spring carrier relative to the main frame;
    a frame mounting bracket;
    a handlebar mounting bracket;
    a mirror including at least a mirror stem, the mirror stem including at least a portion of the mirror stem disposed through the main frame, bearing cap and spring carrier arrangement; and
    a handle, the handle fixedly coupled with the mirror stem.

2. The broad view mirror of claim 1, wherein the mirror stem is threaded through the main frame, the spring carrier arrangement, the bearing cap and the handle.

3. The broad view mirror of claim 1, wherein the spring carrier arrangement comprises:
    a spring carrier;
    a compression spring at least partially disposed within the spring carrier;
    a spring bushing, the spring bushing including at least:
        a shaft of the spring bushing, the shaft of the spring bushing disposed within the compression spring, wherein a face of the spring bushing opposite the compression spring engages a portion of the main frame.

4. The broad view mirror of claim 3, wherein the spring carrier arrangement further comprises:
    an upper bearing, the upper bearing received by the main frame;
    a lower bearing, the lower bearing received by the bearing cap; and
    a lower bushing, the lower bushing received by the bearing cap and disposed between the bearing cap and the handle.

5. The broad view mirror of claim 4, wherein a mirror stem threading arrangement includes at least the mirror stem threaded through an upper spacer, the main frame, the upper bearing, the spring carrier, the lower bearing, the lower bushing, the bearing cap and the handle, a portion of the mirror stem further threaded into a mirror stem lock nut.

6. The broad view mirror of claim 5, wherein a gap between the main frame and bearing cap defines a receptacle for the spring carrier, wherein a height of the spring carrier is shorter than the height of the gap, and wherein at least two threaded fasteners couple the main frame and bearing cap.

7. The broad view mirror of claim 6, wherein the spring carrier is rotatable about an axis of the mirror stem in between the main frame and bearing cap.

8. The broad view mirror of claim 7, wherein a limit of rotation is defined by a portion of the spring carrier engaging a portion of the main frame.

9. The broad view mirror of claim 8, wherein the compression spring biases the portion of the spring carrier to engage the portion of the main frame, the engaged position defining a home position for the mirror stem.

10. The broad view mirror of claim 9, wherein the mirror stem threading arrangement permits an engagement of the handle to rotate the mirror stem against the tensional bias of the compression spring to a second position for the mirror stem, the second position defined by a second portion of the spring carrier engaging a second portion of the main frame, and wherein the handle being released permits the tensional bias of the compression spring to return the mirror stem to the home position for the mirror stem.

11. The broad view mirror of claim 4, wherein a receptacle of the bearing cap for receiving the lower bushing and lower bearing has a first height, and wherein the lower bushing has at least two diameters including at least a first diameter of the lower bushing which fits within the lower bearing, and wherein at least a portion of a second diameter of the lower bushing protrudes through the receptacle and below the bearing cap.

12. The broad view mirror of claim 1, wherein the frame mounting bracket is rotatably coupled with the main frame.

13. The broad view mirror of claim 1, wherein the handlebar mounting bracket is rotatably coupled with the frame mounting bracket, the handlebar mounting bracket including at least a channel for receiving a threaded fastener for coupling the handlebar mounting bracket with a handlebar of a cycle vehicle.

14. The broad view mirror of claim 13, wherein a frame mount axis about which the frame mounting bracket rotates is orthogonal to a handlebar mount axis about which the handlebar mounting bracket rotates.

15. The broad view mirror of claim 13, wherein a frame threaded fastener facilitates the rotation of the frame mounting bracket relative to the main frame, and wherein a mounting threaded fastener facilitates the rotation of the handlebar mounting bracket relative to the frame mounting bracket.

16. The broad view mirror of claim 13, wherein the rotation of the frame mounting bracket and rotation of the handlebar mounting bracket are configurable to maintain the mirror stem in a plumb position.

17. The broad view mirror of claim 16, wherein the rotation of the frame mounting bracket and rotation of the handlebar mounting bracket ensure the plumb position is maintained during engagement of the handle and rotation of the mirror stem.

18. The broad view mirror of claim 1, wherein the broad view mirror is coupled to a handlebar of the cycle vehicle via a bolt through a channel in the handlebar configured for receiving an original-equipment mirror stem.

19. A broad view mirror for a cycle vehicle, comprising:
   a frame arrangement configured for receiving a mirror stem of a mirror;
   a spring carrier arrangement enabling the mirror to rotate responsive to an engagement of a handle coupled with the mirror stem and spring carrier arrangement, the spring carrier arrangement enabling the mirror to return to a home position when the handle is disengaged; and
   a mounting bracket arrangement enabling the mirror stem to maintain a plumb orientation when the handle is engaged.

20. A method of using a broad view mirror for a cycle vehicle, comprising:
   providing a broad view mirror for a cycle vehicle, the broad view mirror including at least a frame mounting bracket and a handlebar mounting bracket;
   passing a threaded portion of a mirror stem through a main frame, a spring carrier arrangement, a bearing cap and a handle of the broad view mirror;
   rotatably threading at least two fasteners through the bearing cap and into the main frame, fixedly coupling the bearing cap and main frame;
   rotatably threading a fastener onto the threaded portion of the mirror stem, fixedly coupling the mirror stem, handle and spring carrier arrangement;
   affixing the handlebar mounting bracket to a handlebar of the cycle vehicle;
   orienting the frame mounting bracket and handlebar mounting bracket relative to one another and to the handlebar of the cycle vehicle to orient the mirror stem in a plumb position;
   receiving an engagement of the handle, the engagement of the handle rotating the mirror stem within the main frame and bearing cap from a first position to the second position, the orientation of the mounting brackets maintaining the mirror stem in a plumb position during rotation, the rotation of the mirror stem providing an operator of the cycle vehicle with a different mirror view via a mirror fixedly coupled to the mirror stem; and
   returning the mirror stem to the first position from the second position upon the handle being disengaged, the returning the mirror via a compression spring of the spring carrier arrangement tensionally biased against a portion of the main frame, the returning the mirror stem providing the operator of the cycle vehicle with an original mirror view via the mirror fixedly coupled to the mirror stem.

* * * * *